(12) United States Patent
Guha et al.

(10) Patent No.: US 11,642,815 B2
(45) Date of Patent: May 9, 2023

(54) FIBER MAT FORMATION FOR STRUCTURAL APPLICATIONS

(71) Applicant: Continental Structural Plastics, Inc., Auburn Hills, MI (US)

(72) Inventors: Probir Kumar Guha, Auburn Hills, MI (US); Philippe Bonte, Pouance (FR); Marc-Philippe Toitgans, Pouance (FR); Dominique Boyer, Pouance (FR); Gaetan Boivin, Pouance (FR)

(73) Assignee: Teijin Automotive Technologies, Inc., Auburn Hills, MI (US)

( * ) Notice: Subject to any disclaimer, the term of this patent is extended or adjusted under 35 U.S.C. 154(b) by 499 days.

(21) Appl. No.: 16/465,022

(22) PCT Filed: Nov. 30, 2017

(86) PCT No.: PCT/US2017/063903
§ 371 (c)(1),
(2) Date: May 29, 2019

(87) PCT Pub. No.: WO2018/102529
PCT Pub. Date: Jun. 7, 2018

(65) Prior Publication Data
US 2019/0381697 A1 Dec. 19, 2019

Related U.S. Application Data

(60) Provisional application No. 62/428,277, filed on Nov. 30, 2016.

(51) Int. Cl.
*B29B 15/08* (2006.01)
*B29B 7/90* (2006.01)
(Continued)

(52) U.S. Cl.
CPC ............ *B29B 15/08* (2013.01); *B29B 7/905* (2013.01); *B29B 13/02* (2013.01); *B29B 13/08* (2013.01);
(Continued)

(58) Field of Classification Search
CPC .............................. B29C 70/18; B29C 70/502
See application file for complete search history.

(56) References Cited

U.S. PATENT DOCUMENTS 4,239,794 A * 12/1980 Allard ................ D04H 1/64
428/219
5,167,876 A * 12/1992 Lem .................. B32B 5/12
252/602
(Continued)

FOREIGN PATENT DOCUMENTS

EP       0370512 A2    5/1990
EP       1434689 A2 *  7/2004    ............ B32B 27/12
(Continued)

OTHER PUBLICATIONS

Kawamura, H., Okubo, T., Kusakabe, K. et al. Plasma surface treatment of milled carbon fibre in a fluidized-bed reactor. J Mater Sci Lett 9, 1033-1035 (1990). https://doi.org/10.1007/BF00727868 (Year: 1990).*

(Continued)

*Primary Examiner* — Alison L Hindenlang
*Assistant Examiner* — Andrés E. Behrens, Jr.
(74) *Attorney, Agent, or Firm* — MaxGoLaw PLLC

(57) ABSTRACT

A process for forming a mat containing a fiber filler including providing one or more sources of extended length fiber; feeding the one or more sources of extended length fiber simultaneously to an automated cutting machine to produce chopped tow fibers; separating the chopped fiber tow into individual chopped fibers that form a fiber filler; coating the (Continued)

fiber filler with a binder; depositing the fiber filler on a first sheet of thermoplastic; covering the fiber filler with a second sheet of thermoplastic to form a stack; and moving the stack to a treatment chamber to form a fiber mat.

12 Claims, 6 Drawing Sheets

(51) Int. Cl.
| | |
|---|---|
| *B29B 13/02* | (2006.01) |
| *B29B 13/08* | (2006.01) |
| *B29C 70/12* | (2006.01) |
| *B29C 70/50* | (2006.01) |
| *B29K 101/12* | (2006.01) |
| *B29K 307/04* | (2006.01) |
| *B29K 309/08* | (2006.01) |

(52) U.S. Cl.
CPC .......... *B29C 70/12* (2013.01); *B29C 70/502* (2013.01); *B29K 2101/12* (2013.01); *B29K 2307/04* (2013.01); *B29K 2309/08* (2013.01)

(56) References Cited

U.S. PATENT DOCUMENTS

| | | | | |
|---|---|---|---|---|
| 5,688,301 | A * | 11/1997 | Brandon | D04H 1/43912 |
| | | | | 65/438 |
| 6,029,897 | A * | 2/2000 | Jander | B29B 11/16 |
| | | | | 239/654 |
| 6,092,394 | A * | 7/2000 | Backer | C03B 37/028 |
| | | | | 65/377 |
| 6,719,869 | B2 * | 4/2004 | Koslow | A61F 13/15658 |
| | | | | 156/276 |
| 7,682,697 | B2 * | 3/2010 | Raghavendran | B32B 33/00 |
| | | | | 428/412 |
| RE44,893 | E * | 5/2014 | Raghavendran | B32B 5/28 |
| | | | | 428/412 |
| 11,072,092 | B2 * | 7/2021 | Guha | B29B 9/14 |
| 2005/0150593 | A1 * | 7/2005 | Honma | D02J 1/18 |
| | | | | 264/510 |
| 2010/0285269 | A1 | 11/2010 | Telander | |
| 2012/0135227 | A1 * | 5/2012 | Kawabe | D01D 11/02 |
| | | | | 428/338 |
| 2015/0147543 | A1 * | 5/2015 | Guha | D01G 1/04 |
| | | | | 428/213 |
| 2015/0258762 | A1 * | 9/2015 | Hagihara | B29C 70/12 |
| | | | | 156/62.4 |
| 2016/0208061 | A1 | 7/2016 | Guha | |
| 2016/0288371 | A1 * | 10/2016 | Ozcan | C08J 5/042 |
| 2018/0313027 | A1 * | 11/2018 | Horimoto | D06M 10/00 |
| 2019/0055680 | A1 * | 2/2019 | Bonte | D04H 1/4218 |
| 2019/0283276 | A1 * | 9/2019 | Guha | D06M 13/513 |

FOREIGN PATENT DOCUMENTS

| | | | | |
|---|---|---|---|---|
| JP | H04-216015 A | | 8/1992 | |
| JP | H08118354 A | | 5/1996 | |
| JP | 2013-049208 A | | 3/2013 | |
| KR | 20170103131 | * | 3/2016 | ............ B29C 70/12 |
| WO | 8301751 A1 | | 5/1983 | |
| WO | 2015084956 A1 | | 6/2015 | |
| WO | WO-2015084956 A1 | * | 6/2015 | ............ B32B 37/24 |

OTHER PUBLICATIONS

KR20170103131 (Young) Mar. 2016 (online machine translation), [Retrieved on Aug. 30, 2021]. Retrieved from: Espacenet (Year: 2016).*

Lipscher, J. (Nov. 15, 2012). Graphite. ColourLex. https://colourlex.com/project/graphite/ (Year: 2012).*

Supplementary European Search Report for 17876740.6, dated Jun. 8, 2020.

Office Action issued in corresponding Japanese Patent Appln. No. 2019-527132, dated Nov. 1, 2021.

Reasons for Rejection issued in corresponding Japanese Patent Appln. No. 2019-527132, dated Sep. 5, 2022.

* cited by examiner

FIBER MAT FORMATION FOR STRUCTURAL APPLICATIONS

CROSS REFERENCE TO RELATED APPLICATIONS

This application claims priority to U.S. Provisional Application No. 62/428,277 filed Nov. 30, 2016, the contents of which is incorporated herein by reference as if explicitly and fully expressed herein.

FIELD OF THE INVENTION

The present invention in general relates to fiber mat formation and in particular, to using randomized chopped fiber tow to form fiber perform mats for structural applications.

BACKGROUND OF THE INVENTION

The economic and environmental pressures to produce vehicles that are lighter and stronger have only accelerated in the past few years. While weight savings were traditionally achieved by migrating from steel components to aluminum, even with the resort to newly engineered structures with reinforced stress points to account for the use of less metal, the ability to glean additional weight saving from aluminum components is diminishing. Sheet molding compositions (SMC) and resin transfer moldings (RTM) that are based on thermoset resin matrices have a lower inherent density than aluminum. The ability to mold complex components also represents a potential advantage of such materials over aluminum.

As a polymeric matrix of thermoset or thermoplastic with fiber reinforcement has attractive properties in terms of high strength to weight ratios. Sheet molding compositions (SMCs) have long been considered in automotive and aerospace applications as an alternative to metal body components. Similarly, thermoplastics with fiber reinforcements are able to meet performance requirements that could not be attained by thermoplastics absent such reinforcements. While there have been numerous attempts to develop models to create preforms, these have generally relied on a process of catching fibers from a slurry on a screen contoured in the shape of the desired preform, followed by a secondary drying to set the shape of the preform. Thermoplastic binders have been used in concert with heat to set the fibers in the preform shape. The preform is then subjected to optional trimming and impregnated with reactive resin through a reaction injection molding process to form a composite article. A molding technique is detailed, for example, in U.S. Pat. No. 4,849,147. A lifting screen preform mold process and apparatus is provided for example in U.S. Pat. No. 6,086,720.

To obtain reliable quality articles for automotive and other high stringency applications, it is important the fiber preforms and mats have piece-to-piece constituency and a uniform fiber density within various regions of the preform or mat. Typically, preforms tend to accumulate excess fibers proximal to edges while the center regions tend to be fiber deficient. This inhomogeneity in fiber density and also a degree of undesirable fiber preferential orientation are caused by fiber movement between contact with the preform mold screen and preform set of fiber position. While glass fibers are observed to have a nominal degree of fiber aggregation in a slurry that leads to the formation of an oriented clump of fibers being formed in a preform, these tendencies towards aggregation are more pronounced for other types of fibers such as carbon fibers and cellulosic-based fibers. While variant techniques have been explored, problems persist with slurry preform formation associated with limited throughout, and inhomogeneity of fiber densities within a preform.

The use of fiber inclusions to strengthen a matrix is well known to the art, and in the context of sheet molding composition (SMC) formulations and bulk molding composition (BMC) formulations; hereafter referred to collectively as "molding compositions", fiber strengthening has traditionally involved usage of chopped glass fibers. There is a growing appreciation in the field of molding compositions that replacing in part, or all of the glass fiber in molding compositions with carbon fiber. However, this effort has met with limited success owing to differences between glass and carbon fibers. Specifically, these differences include fiber diameter with glass fibers used in molding compositions having typical diameters of between 16 and 30 microns while carbon fibers typically have diameters of between 2 and 10 microns. Additionally, whereas glass rovings, fabrics, or bundles typically have tens to hundreds of individual fibers, carbon fiber tows typically come in bundles of thousands and even tens of thousands of individual fibers. A still further difference exists in the fiber-fiber interactions where glass fibers tend to scatter and debundle upon chopping, Van der waals bonding and other inter-fiber surface interactions tend to make carbon fiber disinclined from debundling after chopping into desired lengths for use as reinforcement in a molding composition. While the debundling of carbon fiber tows is addressed in laboratory scale moldings through manual manipulation, problems exist for production scale debundling of carbon fiber tow into separate chopped carbon fibers.

Furthermore, difficulties have been encountered in producing mixed fiber resin matrix articles for the formation of a uniform layer of randomly oriented and intermixed glass fibers and carbon fibers. Similarly, the limited access to mixed fiber rovings and non-wovens has hampered efforts to reduce weight of vehicle body panels. Fibers for fiber reinforced resin molding are typically produced by chopping a tow formed bundles of long fiber lengths into preselected lengths. While glass fibers are usually produced in tows of a few hundred fibers and cut cleanly to produce individual fibers, carbon fibers as stated previously have diameters of about 2 to 10 micrometers, much smaller than glass fibers with diameters of 10 to 25 micrometers, and are manufactured in tows that contain tens of thousands of fibers. Owing to physical and chemical differences carbon fibers tend to form clumps of fibers rather than randomly oriented, individual fibers commonly observed with glass fibers.

Co-pending application Ser. No. 14/398,673 filed on May 1, 2013 entitled "Process of Debundling Carbon Fiber Tow and Molding Composition Containing Such Fibers", herein incorporated by reference provides a process and apparatus to debundle carbon fiber tow into separated chopped carbon fibers in a continuous manner, and facilitates interaction of carbon fibers with molding composition components to enhance the strength of a resulting SMC or BMC. However, debundling even with these processes remains elusive as solvents tend to create an environmental hazard and do not adequately wet and spread fibers that make up the tow.

Thus, there exists a need for a process to debundle fibers or a blend fiber tows into separated chopped fiber tow or filamentized fibers in a continuous manner to provide for an even distribution of fibers in a perform, mat, or molding composition to enhance the strength of a resulting SMC, BMC, thermoplastics, and a structure formed thereof. There further exists a need for a process and system that affords a homogenous layer of randomly oriented fibers across a desired lateral extent.

SUMMARY

An inventive process for forming a mat containing a fiber filler is provided and includes providing one or more sources of extended length fiber; feeding the one or more sources of extended length fiber simultaneously to an automated cutting machine to produce chopped tow fibers; separating the chopped fiber tow into individual chopped fibers that form a fiber filler; coating the fiber filler with a binder; depositing the fiber filler on a first sheet of thermoplastic; covering the fiber filler with a second sheet of thermoplastic to form a stack; and moving the stack to a treatment chamber to form a fiber mat.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1:
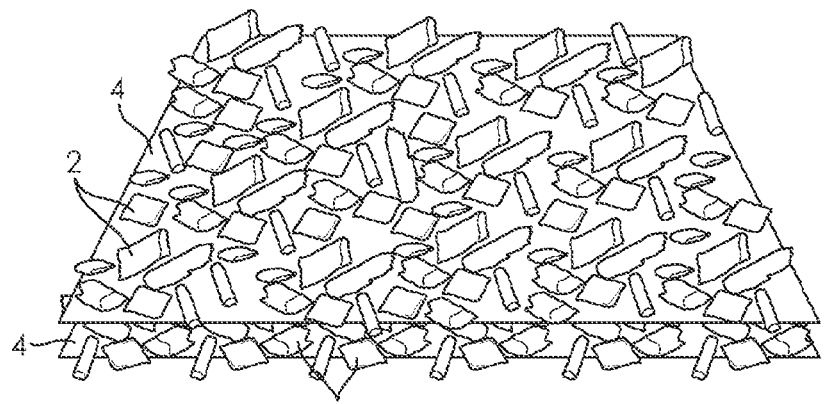
FIG. 1 shows layers of chopped fiber tow placed between sheets of thermoplastic.

The present invention has utility as a process and system for a chopped fiber mat that is a blend of chopped and dispersed fibers with an increased volume interspersed between sheets of thermoplastic on an automated production line amenable for inclusion in molding compositions as a blended fiber mat for structural applications. The blend of fibers may include thermoplastic, glass, carbon, polyimides, polyesters, polyaramides, polyamides, and combinations thereof. The blend of fibers may be simultaneously supplied to an automated cutting machine illustratively including a rotatory cutter that discharges chopped fibers into a vortex created by directional aeration. With resort to deionized air still further dispersion results compared to untreated air.

In addition to single type fiber tows, it is appreciated that a given fiber source includes a mixed tow, spool, yarn, or fabric formed with more than one fiber type. In a specific inventive embodiment, a mat is formed from a stack of thermoplastic sheets containing an individualized and randomized blended ratio of fibers of: thermoplastic fiber from 25% to 80% by weight, glass fiber from 0% to 75% by weight, carbon fiber from 0% to 75% by weight, and a binder in the range of 0% to 25% by weight, with the proviso that at least one of the glass, carbon, or binder fiber is present and in an amount 20% to 75% by weight. The blend of chopped fibers and binder may be used to form a chopped mat. The chopped fiber tow is randomized and filamentation is used to separate the chopped tow into individual fiber strands that increases the volume occupied by the chopped fiber. A charge pattern may be made using the layered mat, which may be heated in an oven to a temperature at or higher than the melting point of the thermoplastic fibers. The preheated charge pattern may then be compression molded in a mold maintained at a temperature lower than the melting point of the thermoplastic fibers.

In a specific embodiment Curie fillers may be included in the mat for faster pre-heating. A Curie filler promotes rapid drying of the preform mat by thermal exposure. High thermal conductivity fillers operative herein illustratively include carbon fibers with values of 8-70 W/m-K (pan) and 20-1000 W/m-K (pitch), MN 260 W/m-K, BN 300 W/m-K, graphite 600 W/m-K, or carbon black, alumina, or combinations thereof. Incorporating fillers with paramagnetic properties in the fiber matrix allows the preform to be heated rapidly by induction heating for rapid cure cycles and for improved fiber wet-out. The paramagnetic properties keeps preform from overheating above the Curie temperature of the paramagnetic particle. Paramagnetic fillers of gadolinium and $CrO_2$ with Curie temperature of 292 and 386 Kelvin, respectively are used, each alone or in combination to promote self-limiting induction heating. High thermal conductivity fillers or paramagnetic fillers are present from 0.0001 to 5 total weight percent of the stack.

As used herein, the terms with respect to carbon fiber tow of "lofting" "debundling" and "spreading" are used synonymously. The "de-bundling" of the carbon fibers allow the resin matrix to "wet-out" the individual fibers more completely for better transfer of stresses in the final molded part thus rendering the part better able to withstand stresses and strains in normal usage.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

As used herein, the tow volume is defined by the maximal area in a given cross section of tow multiplied by the length of the tow.

In certain inventive embodiments, the tow is a single carbon fiber; a single glass fiber tow, or a hybrid tow containing both glass and carbon fibers that is chopped and distributed. In still other inventive embodiments, multiple tows are simultaneously input, the multiple tows being carbon, glass, or a combination thereof. Typical lengths of chopped fibers used in the present invention typically range from 0.1 to 5 centimeters (cm). The diameters of fibers are appreciated to vary widely based on commercial sources with glass filler fibers having typical diameters of 0.03 to 0.5 millimeters (mm); carbon fibers having typical diameters of 0.005 to 0.1 mm. It should be appreciated that fiber dimensions outside of the aforementioned typical ranges exist and are intended to be within the scope of the present invention The tow or tows are subjected to cutting element that divides the tow into preselected lengths of cylindrical bundles of fibers. The cutting element includes a variety of conventional blades including a spinning chopper blade, a liner actuated chopper blade, a water jet, and a laser cutter.

According to the present invention, chopped tow fibers are fed into a pressuring gas flow in a tube to induce a vortex of tumbling fibers. By controlling the time and rotation rate in the vortex, a desired degree of tow dispersion into small clusters of fibers, individual fibers (filamentation) or a combination thereof is obtained. The vortex formation dynamics are known to the art. M. F. Unal and D. Rockwell (1988). Journal of Fluid Mechanics, 190, pp 491-512. While the use of a cylinder as a tube is appreciated to offer advantages in terms of uniformity owing to the limited ability of swirling gas and fibers to form eddies therein and is uniform in vertical cross-section, it is appreciated that other tube shapes are also operative herein including spherical, hemispherical, conical, and polygonal cross-section shapes, where the cross-section is triangular, square, and higher order right polygons. Briefly, by directing a pressurized gas flow at into a tube containing the chopped fibers with both rotary and vertical flow components, a vortex is formed. The dwell time of fibers in the cylinder can be extended to near infinite time by controlling the upward gas flow. In some embodiments, the tube itself is rotated as well to further enhance fiber debundling and mixing in the vortex.

Gases suitable for forming a vortex in a tube are limited only to compatibility with the fibers. Exemplary gases operative herein illustratively include air, nitrogen, carbon dioxide, carbon monoxide, hydrogen, noble gases, and a combination thereof. It is appreciated that in additional to debundling fibers, the tube is readily provided with electrodes, 24 in FIG. 6, to support an atmospheric pressure plasma to perform surface modification of the fibers during debundling. By way of example, surface functionality is added through plasma treatment during debundling or a fiber sizing is chemically modified to render the fiber more reactive toward a subsequently applied matrix. U.S. Pat. No. 9,149,834 is representative of such fiber modification.

In still other inventive embodiments, the gas flow entrains a stream of particulate fillers so as to form a debundled fiber mass that includes such filler particles interspersed therethrough. Particulate fillers that are entrained within such a gas flow illustratively include inorganic particles such as silica, carbon black, calcium carbonate, a hollow glass microspheres; synthetic organic particles such as polymeric beads of polystyrene, and hollow polymeric beads; and naturally occurring particles such as ground shells and husks of plants such as coconut, rice hulls, walnut shells; egg shells; and combinations thereof. Particles for entrainment are provided in a particulate reservoir 22 in FIG. 6 that meters particulate into a gas stream passing thereby.

Regardless of whether chemical modification occurs in the tube, the debundled fibers are gravity fed onto an underlying belt with a generally random fiber orientation in the plane defined by the belt. It is appreciated that such debundled fibers will tend to lay in the plane of the belt on initial deposition, defined a zero-degree angle relative to the belt plane, yet as the thickness of a layer of fibers builds on the belt, the average fiber angle of incline relative to the belt increases to values from greater than 0 to 60 degrees. Filamentation increases the volume occupied by the debundled fibers.

By sizing the tube relative to the width of the belt, a lateral distribution of fibers is obtained that varies by less than 20 fiber number percent across the width of the chopped fiber mass on the belt in some inventive embodiments. While in other inventive embodiments, the later distribution of fibers is less than 10 fiber number percent. It is appreciated that with resort to an inward angled rail, relative to the direction of movement of the belt, that fibers at the edges of the belt are preferentially urged inward to create a narrower lateral width of fibers on the belt, but a width that is more uniform. In some embodiments the tube is pivoted side to side relative to the direction of belt movement to vary the lateral distribution of chopped fibers on the belt.

The debundled fibers in some embodiments are chemically treated either within the tube or on the belt. Chemical treatments operative herein illustratively include silanes, silisequioxanes (SQs), and combinations thereof. It is appreciated that chemical treatments in some embodiments are accomplished with heating, actinic radiation, or plasma to promote bond formation between the additive and the fiber.

In some embodiments of the present invention, particulate filler is applied as a layer at this point in the belt transit. The particulate fillers including the aforementioned materials.

A binder may then be sprayed on the chopped fiber mass. It is appreciated that the fiber mass in some inventive embodiments is compressed prior to spray application of the binder. The binder is applied neat or a suspension or solvate in a solvent. Binders operative herein illustratively include powders, fibers, resins, and solvent sprays. Exemplary binders include latexes, epoxies, phenolic resins, polyesters, solvents that solubilize the thermoplastic fibers, and combinations thereof. It is appreciated that binder spray in some embodiments are accomplished with heating, actinic radiation, or plasma to promote bond formation between the binder and the fiber, so simply solubilizes or at least renders thermoplastic fibers tacky to induce joinder as the solvent is driven off.

Embodiments of the present invention provide an improved fiber dispersion in terms of lateral uniformity, randomness in the plane of the belt, inclusion of particulate therein, debundling, or a combination of any of the aforementioned as compared to existing processes. The control of fiber properties and the continuous production process to produce a binder retained fiber mass according to the present invention is then available in certain embodiments to be dispersed in molding composition formulations prior to formulation cure, as well as for use in perform mats for use in composite molds illustratively including SMC and resin transfer molding (RTM). Preform mats formed by the inventive process and system for thermoset resin composition molding that upon cure form a variety of molded and fiber reinforced articles. Such articles are used in a variety of applications such as vehicle components such as bed lines, body components, trim, interior components, and undercar components; architectural components such as trim and doors, marine components such as hulls, trim, and cockpit pieces; and similar structures in aerospace settings.

Figure 2:
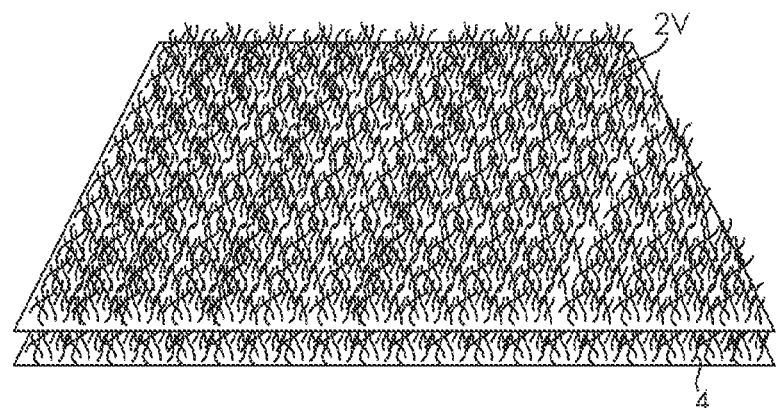
FIG. 2 shows layers of chopped fiber tow that has undergone filamentation to increase the volume of the chopper fiber layers.
Figure 3:
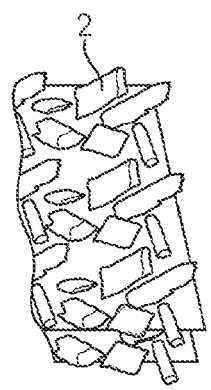
FIG. 3 shows the difference in volume between chopped fiber and chopped fiber that has undergone filamentation.
Figure 4:
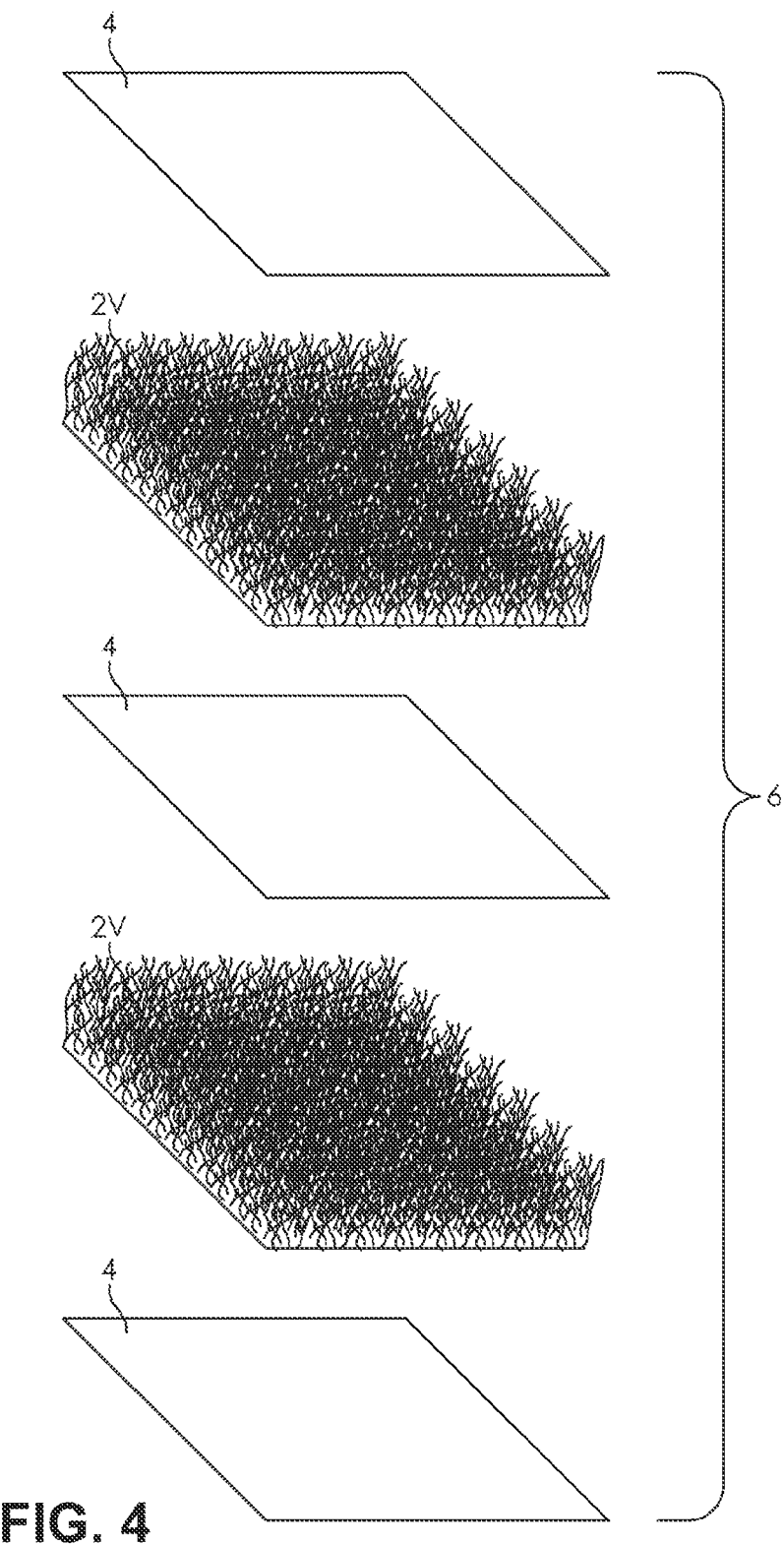
FIG. 4 is an exploded view of a multi-layered composite mat formed with sheet layers of thermoplastic interspersed with chopped fiber that has undergone filamentation.

Referring now to the figures, FIG. 1 shows layers of chopped fiber tow 2 placed on and between sheets of thermoplastic 4. The individual fibers that make up the tow remain together in each piece of the chopped fiber tow. In FIG. 2 the chopped fiber tow has undergone filamentation to increase the volume of the chopper fiber layers 2V by separating the individual fibers in the fiber tow. FIG. 3 shows the difference in volume between chopped fiber 2 and individualized chopped fiber 2V that has undergone filamentation. FIG. 4 is an exploded view of a multi-layered composite mat 6 formed with sheet layers of thermoplastic 4 interspersed with individualized chopped fibers 2V that has undergone filamentation.

Figure 5:
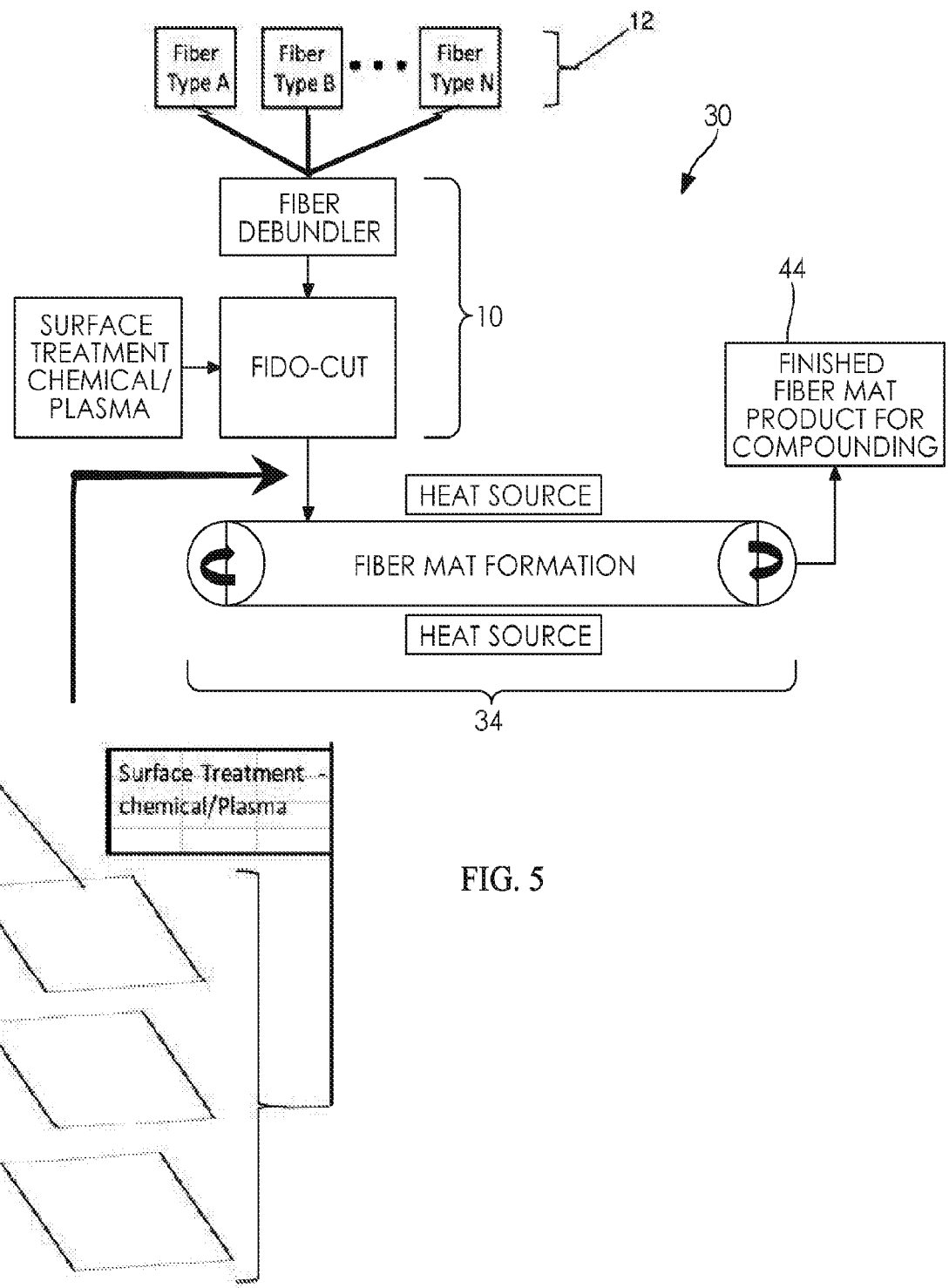
FIG. 5 is a function block diagram of a system showing the major functional blocks including a fiber dosing and cutting machine and a treatment chamber used in the practice of the invention.
Figure 6:
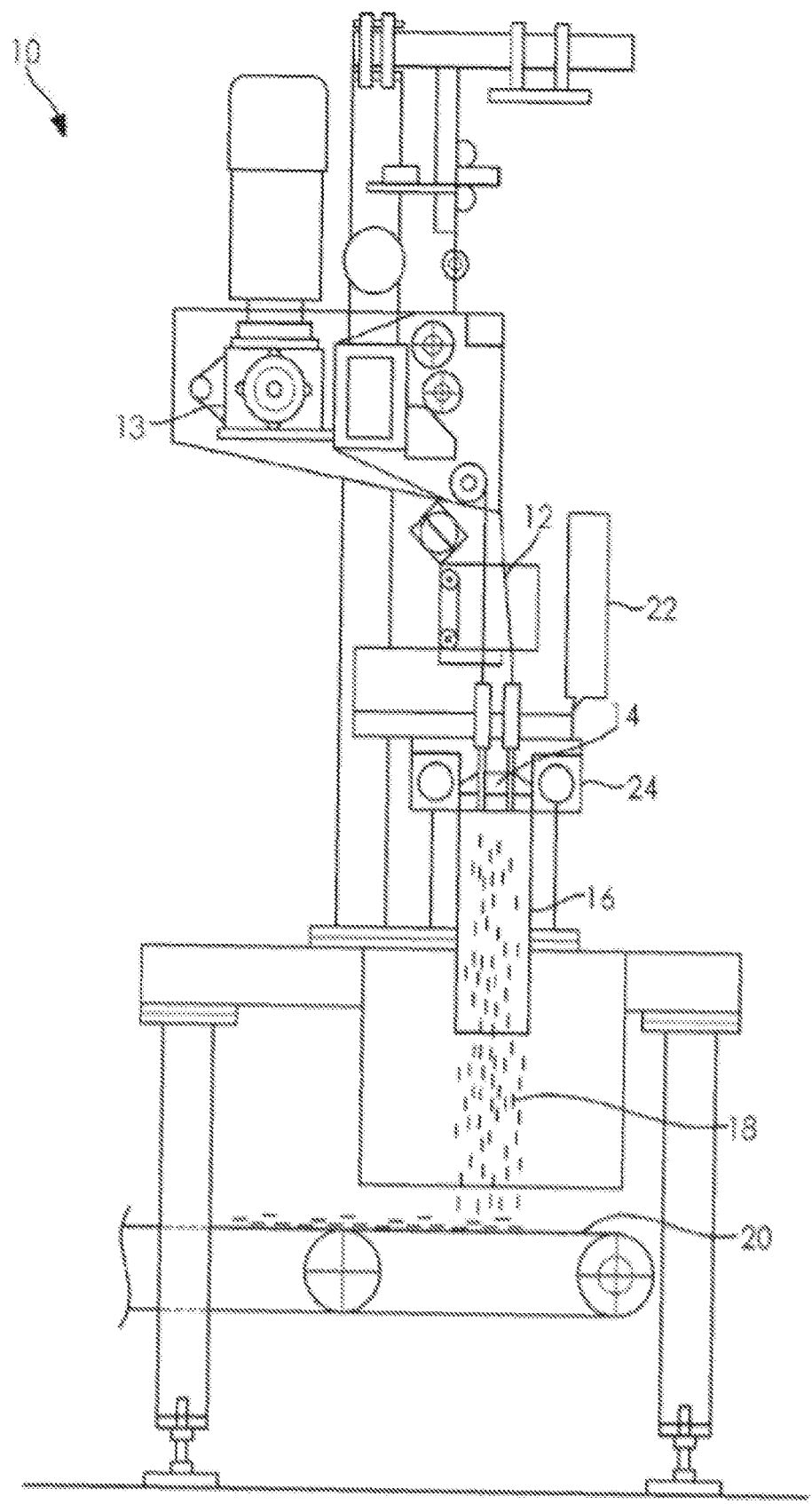
FIG. 6 is a cross sectional view of a fiber dosing and cutting machine according to the present invention operative in cutting and debundling fiber tow for disbursement in a perform mat or composite material.
Figure 7:
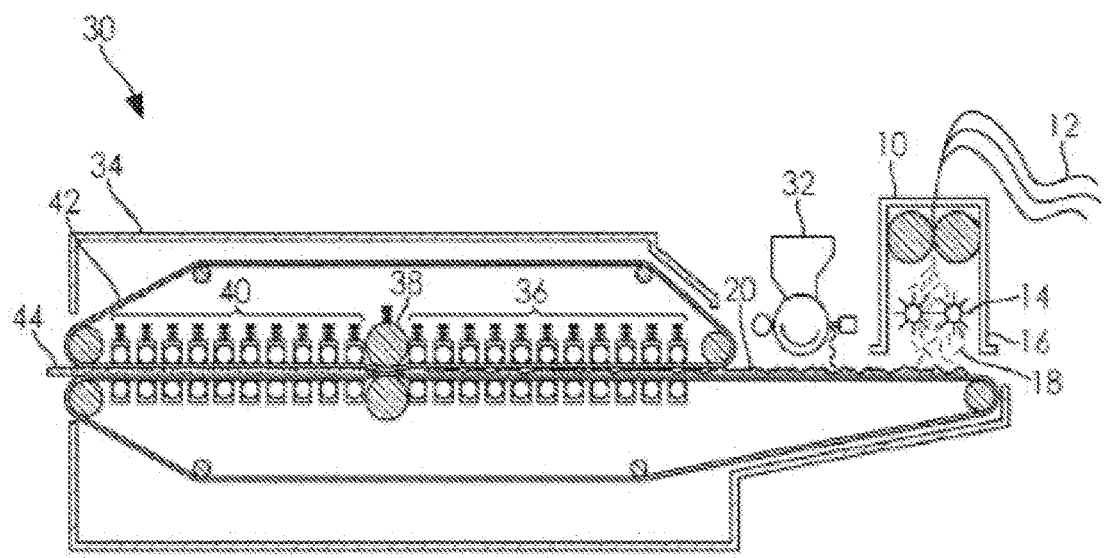
FIG. 7 is a detailed cross-sectional view of the system shown in FIG. 5 for producing a chopped fiber perform mat with the fiber dosing and cutting machine shown in FIG. 6 in accordance with embodiments of the invention.

FIGS. 5-8 illustrate a system 30 for forming fiber mats 6 for use in SMC and RTM. FIG. 5 is a function block diagram of the system 30 showing the major functional blocks including a fiber dosing and cutting machine 10 and a treatment chamber 34 with two or more sources of differing fibers 12. FIG. 6 is a cross sectional view of a fiber dosing and cutting machine and is shown generally at 10. Two or more differing fiber tows 12 are fed from feeder reels 13 into a cutting element 14 as detailed above for chopping the tow. The one or more fiber tows may be a mixture of glass, carbon, natural, and chemical based tows. The blended chopped fibers are dropped downward through a tube 16 under helical gas flow in a vortex to separate and disperse the chopped fibers 18 on to a moving belt 20. In order to increase the volume of the chopped tow, the tube 16 in some embodiments includes a plasma generation electrode set 24. As shown in the system view 30 in FIG. 7, the chopped fibers 18 exiting from the fiber dosing and cutting machine 10 on to the moving belt are coated with a binder applied from a dispenser 32. The nature of the binder having been detailed above. It is appreciated that a similar dispenser to dispenser 32 is used to dispense a chemical additive prior to, or subsequent to the binder dispenser 32. Such additives include the aforementioned. While not shown for visual clarity, the application of a binder or an additive each independently is accompanied with an activation energy input such as a thermal source, a light source, or a plasma source. The treated fibers are then moved in to a treatment chamber 34 where the filers are pressed with rollers 38 between the moving belt 20 and an upper moving belt 42 into a sheet or mat 44. The treatment chamber has a first heating section 36 that cures the chemically treated fibers 20, and a second cooling section 40 prior to the exit of the sheet or mat from the chamber 34. It is appreciated that the atmosphere in chamber sections 36 and 40 are each independently controlled and illustratively include air or inert gases of a preselected temperature.

Figure 8:
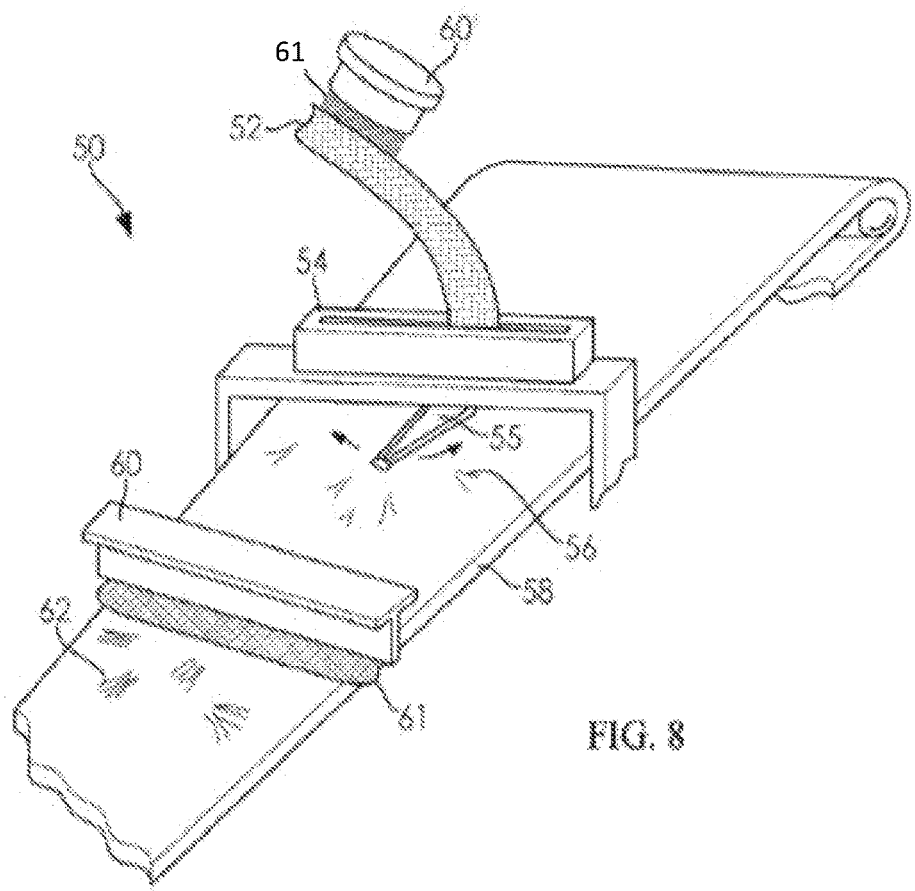
FIG. 8 is a schematic of the entry portion of the conveyor equipped treatment chamber with a plasma generator source impinging on carbon fiber tow in accordance with an embodiment of the invention.

In an embodiment of an inventive apparatus that is shown in FIG. 8 generally at 50, two or more tows of differing fiber 52 are fed into a conventional chopper 54 at a preselected rate relative to the speed of operation of the chopper 54 to yield preselected lengths of blended fiber tow 52. These lengths of chopped carbon fiber tow 56 are collected on a conveyor 58 passing beneath the chopper 54. In some embodiments, the chopped lengths of tow 56 are further randomized as to position and orientation along the width of the conveyor 58 with resort to spreader 55. The one or more plasma generating sources 60 are mounted above the conveyor 58 such that the preselected lengths of chopped carbon fiber tow 56 are exposed to plasma generated by the one or more plasma generating sources 60. Under the influence of plasma 61 exposure the lengths of chopped carbon fiber tow 56 expand to more than 50 percent of the pre-plasma exposure to form a lofted tow 62 and in other embodiments to volumes of more than 200 percent of pre-plasma treatment sizes. In some embodiments the conveyor 58 has a width that ranges between 0.9 to 1.8 meters. The extent of the volume increase is controlled by factors including the ion energy of the plasma, the plasma flux, rate of conveyor movement, carbon fiber sizing identity, number of fibers in the tow, and proximity of plasma source to carbon fibers. In some inventive embodiments, hot plasma is used to effectively debundle both chopped carbon fibers and intact carbon fiber tows. The use of plasma for debundling carbon fibers is more fully described in co-pending provisional application filed herewith and entitled DISPERSED FIBER MAT FORMATION, and is included herein in its entirety by reference.

In still other embodiments, one or more plasma generating sources 60' are provided in place of, or in concert with the one or more plasma generating sources 60. It is appreciated that the plasma generating source 60' is of the same type as a generator 60, or varied as to operational parameters to loft the tow 52 prior to entering the chopper 54. In an inventive embodiment, the carbon fiber tow 52 ranges at least 1,000 carbon fibers to at least 10,000 carbon fibers and in other embodiments 50,000 carbon fibers or even more fibers per tow. It is appreciated that the plasma generating source 60 emits a cylindrical plasma from a circular electrode, or a rectilinear volume of plasma from a race track-shaped annulus. The chopped carbon fiber obtained according to the present invention is then available in certain embodiments to be dispersed in sheets of molding composition formulations prior to formulation cure as the sheets move along a production line conveyor. Through control of the molding composition monomer polarity in a thermoset resin, still further dispersion and anisotropy of the chopped, plasma lofted carbon fibers are obtained.

In other inventive embodiments, the debundled fibers are conveyed into a rapid thermal multi-processing (RTM) system in general and specifically to mold corresponding to a carbon fiber pre-form or mat for an RTM molding. The debundled blended fibers of the present invention provide higher strength moldings. Without intending to be bound to a particular theory fiber wetting is enhanced by the inventive process.

The stability of the plasma, the heat stress on the fibers and particles, fiber and particle surface area, fiber and particle loading, and the homogeneity and quality of the activation of the fiber and particles are influenced by the pressure and gas flow conditions within the plasma and in the fluidized bed. Determination of a desired level of activation is measured by iteration with iodometry titration, or simply reaction with coupling agents to the activated particles and testing of final thermoset article properties. In some embodiments, in order to reduce the temperature further, to cool the gas during generation of the plasma, jacketed cooling tubes are employed that are charged with a suitable gaseous or liquid coolant. Air and water are exemplary gaseous and liquid coolant fluids.

Figure 9:
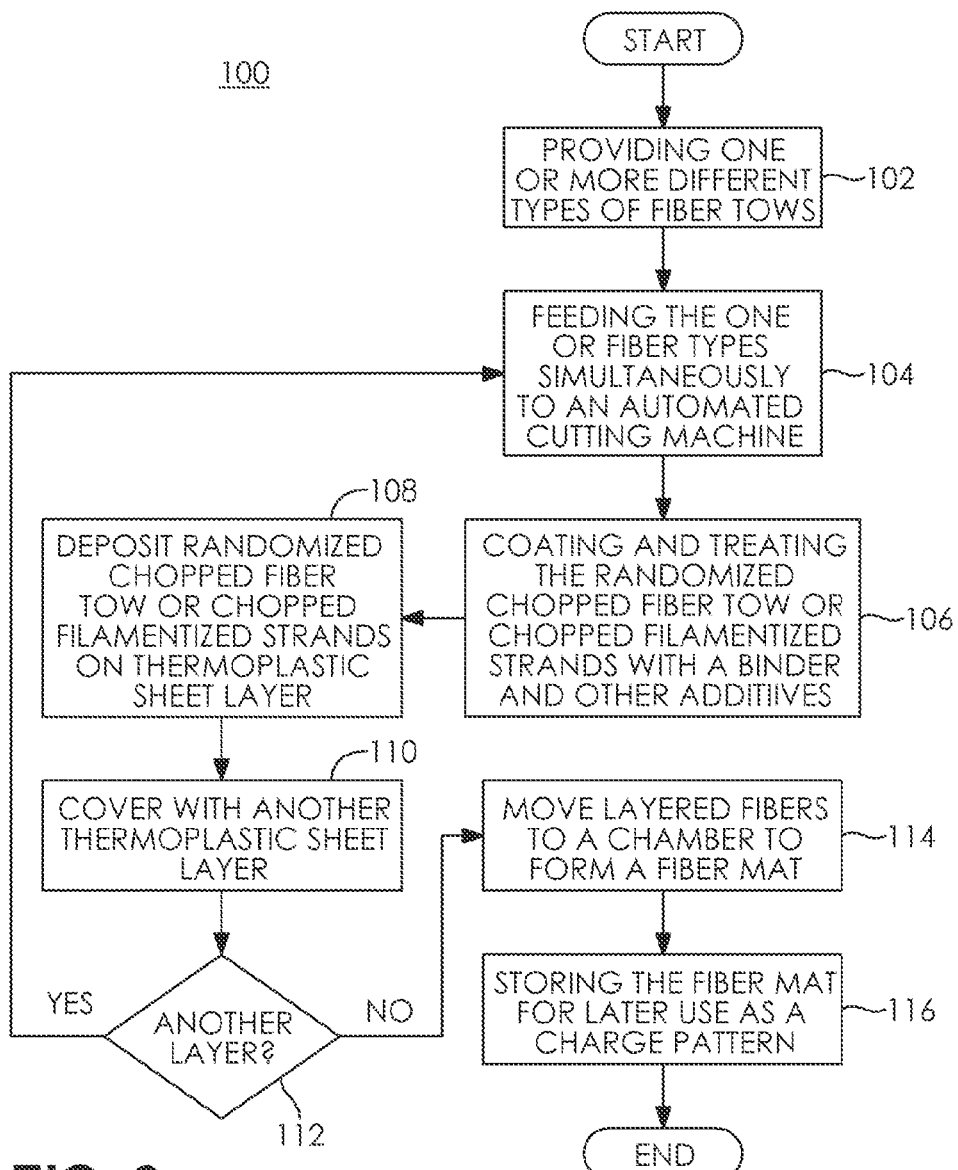
FIG. 9 is a flow diagram of a process using a blend of fibers to form chopped fiber perform mats for structural applications in accordance with embodiments of the invention.

FIG. 9 is a flow diagram of a process 100 using a blend of fibers to form chopped fiber perform mats for structural applications. The process starts with providing one or more different fiber tows (step 102) that will constitute the fiber content of the mat in desired weight proportions. Fiber tows may illustratively include thermoplastics, glass, carbon, cellulosic, and binders. The various fiber tow are simultaneously fed to an automated cutting machine (step 104), and the resultant chopped fibers are coated with a binder and other additives and the chopped fibers may be plasma treated to filamentize the chopped tow into individual randomly oriented individual fibers to increase volume (step 106). The coated and treated fibers are then deposited on a thermoplastic sheet (step 108), and covered with an additional thermoplastic layer (step 110). At decision step 112 if another layer of chopped fiber is to be added (step 112 is Yes) the process steps 104-110 are repeated. If another layer or no further layers are to be added (step 112 is No) the layered structure is moved to a treatment chamber to form a fiber mat (step 114). The mat is stored for later use as a charge pattern (step 116), and the process concludes.

EXAMPLES

Example 1

Plaques are molded in glass (2400 Tex) in varying fiber lengths of 10, 15, 25, 35, and 50 mm to test mechanical properties based on fiber length.

Example 2

Plaques are molded with and without filamentation with twenty-four thousand (24 K) strand tow with fibers cut to 25 mm to test mechanical properties.

The foregoing description is illustrative of particular embodiments of the invention, but is not meant to be a limitation upon the practice thereof. The following claims, including all equivalents thereof, are intended to define the scope of the invention.

The invention claimed is:

1. A process of forming a mat containing a fiber filler comprising: providing one or more sources of extended length fiber; feeding the one or more sources of extended length cylindrical fiber tow simultaneously to an automated cutting machine to produce lengths of cylindrical bundles of chopped fiber tow; randomizing and filamentizing the lengths of cylindrical bundles of chopped fiber tow into individual chopped fibers by tumbling using a vortex formed within a tube to form a fiber filler; coating the fiber filler with a binder; depositing the fiber filler on a first sheet of thermoplastic; covering the fiber filler with a second sheet of thermoplastic to form a stack; and moving the stack to a treatment chamber to form a fiber mat.

2. The process of claim 1 wherein said one or more sources of extended length fiber are glass, carbon, polyimides, polyesters, polyaramides, polyamides, a mixed tow of any of the aforementioned, or a combination thereof.

3. The process of claim 1 wherein the vortex formed within the tube is accomplished with deionized air.

4. The process of claim 1 wherein a plurality of types of extended length fiber are supplied to provide a defined ratio by weight in the fiber mat.

5. The process of claim 4 wherein the defined ratio of two or more fibers thermoplastic fiber from 25% to 80% by weight, glass fiber from 0% to 75% by weight, carbon fiber from 0% to 75% by weight, and a binder in the range of 0% to 30% by weight where are least one of glass fiber, carbon fiber, and binder are present in a total amount of 20% to 75% by weight.

6. The process of claim 1 further comprising adding Curie fillers.

7. The process of claim 1 further comprising exposing the chopped fibers to a plasma or flame treatment prior to said covering.

8. The process of claim 7 wherein the exposing step is within a fluidized bed reactor.

9. The process of claim 7 wherein the plasma is cold plasma.

10. The process of claim 7 wherein the plasma is hot plasma.

11. The process of claim 1 further comprising adding additional layers of the fiber filler between additional sheets of thermoplastic.

12. The process of claim 1 wherein the treatment chamber has a set of heated rollers maintained at or above a softening temperature of the thermoplastic sheets and the stack is moved at a speed past the set of heated rollers to fuse the stack.

\* \* \* \* \*